United States Patent [19]
Hjelmeland et al.

[11] Patent Number: 5,980,628
[45] Date of Patent: Nov. 9, 1999

[54] CURABLE GYPSUM-CONTAINING COMPOSITION AND METHOD FOR STABILIZATION OF UNCONSOLIDATED CORE SAMPLES

[75] Inventors: Odd Hjelmeland, Hundhammeren; Bjorn Arild Ardo, Levanger, both of Norway

[73] Assignee: Reslab AS, Trondheim, Norway

[21] Appl. No.: 08/973,317

[22] PCT Filed: May 14, 1996

[86] PCT No.: PCT/NO96/00116

§ 371 Date: Mar. 6, 1998

§ 102(e) Date: Mar. 6, 1998

[87] PCT Pub. No.: WO96/38394

PCT Pub. Date: Dec. 5, 1996

[30] Foreign Application Priority Data

May 30, 1995 [NO] Norway ..................................... 952124

[51] Int. Cl.$^6$ .............................. C04B 28/16; E21B 25/08
[52] U.S. Cl. ........................... 106/778; 106/781; 106/785; 106/776; 175/58; 175/226; 175/424
[58] Field of Search ..................................... 106/778, 781, 106/785, 776; 175/20, 58, 226, 424

[56] References Cited

U.S. PATENT DOCUMENTS

| 4,661,161 | 4/1987 | Jakacki et al. | 106/781 |
| 4,713,115 | 12/1987 | Sato et al. | 106/778 |
| 5,273,579 | 12/1993 | Tanaka et al. | 106/785 |
| 5,360,074 | 11/1994 | Collee et al. | 175/226 |
| 5,855,948 | 1/1999 | Mill et al. | 426/599 |

*Primary Examiner*—Michael Marcheschi
*Attorney, Agent, or Firm*—Alix, Yale & Ristas, LLP

[57] ABSTRACT

A curable gypsum-based composition for the production cured gypsum matrix. The composition comprises two-components, the first component includes calcined gypsum suspended in water, and a set retarding substance comprising (i) an organic acid containing at least two acid groups selected from the group consisting of carboxyl, sulphate, sulfonate, phosphate and phosphonate, the acid optionally also containing at least one hydroxy group per molecule; and/or (ii) inorganic anions selected from the group consisting of polyphosphate, polyborate and mixtures thereof. The second component comprises a set accelerating substance including water-soluble salts of multivalent metal ions. The water soluble salts in the second component form stable precipitates or complexes with the organic acid in the first component. The second component may also comprise easily soluble salts of ammonium and/or cations from the first group of the periodic table of the elements, which will accelerate the hardening process. Also a method for stabilizing core sample material from a drilling hole. The method at least partially encapsulates the core sample material in a cured gypsum matrix.

17 Claims, No Drawings

CURABLE GYPSUM-CONTAINING COMPOSITION AND METHOD FOR STABILIZATION OF UNCONSOLIDATED CORE SAMPLES

The invention concerns a curable gypsum-containing composition for the production of a cured gypsum-based matrix, and a method for stabilization of unconsolidated core samples, according to the introductory of claims 1 and 9, respectively.

TECHNICAL BACKGROUND

In the production of gypsum articles, casting molds of gypsum and in building applications, such as for wall finishing, for example, it is known to use a solution/suspension of calcined gypsum, optionally added set accelerating or set retarding substances. A common feature of such curing gypsum systems is that the pot life or the time until gelation is about one half of the time to obtain full strength. The disadvantages of set retarding additives for gypsum/water compositions is that the compositions after application to a wall or into a mold, will creep or block the form for a long period of time. Some retarding substances require from 15 minutes to 8 hours to obtain a strength level allowing further processing or handling, dependent on the portion of the retarding substance. On the other hand, normal or set-accelerating additions to gypsum compositions may result in a short pot life since gelation may occur from one minute to fifteen minutes after the preparation of the composition. This may result in problems such as hardening in mixer units and pumps and lead to clogging or blocking of the equipment.

Accordingly, there is a need for a curable gypsum-based composition providing a gypsum composition ready for use, a composition having a long pot life but short setting time after application and preventing creep from for example a finished wall.

In another aspect, core samples are obtained from oil and gas drilling both off-shore and onshore by means of special drill heads provided with a central cylindrical bore. When the cylindrical bore or space extending form the drill head and a certain distance up the drill stein is full, the drill stem is withdrawn, and a so-called core sample is removed from the same. These core samples represent some of the most important material available for evaluation of the quality of the hydrocarbon-containing sedimentary rock types to be searched for. For that reason it is of considerable importance that the samples are protected from both mechanical and chemical strain to obtain correct values from the subsequent evaluation and analysis.

The geologists evaluation and analysis of the humidity properties of the sample, permeability, porosity and oil and water content, can provide the limits of the gas- and oil-containing layer thickness, the expected quantity of oil and/or gas to be produced, and the availability of the oil or gas. Therefore, it is important that these samples are as close in the reservoir to their original condition as possible, to provide a proper basis for both visual evaluation of the core material and subsequent analysis. In many cases, the samples are poorly consolidated and have to be protected from disintegration during transportation from the reservoir, during preparative cutting and drilling with diamond equipment and during the following analysis.

Presently, there are one of two important methods used to protect the cores mechanically during tansportation, core sampling and storage. These methods have different advantages and disadvantages:

1. Freezing core samples with liquid nitrogen

This method will stabilize all core samples containing water and oil since the sand is locked in a matrix consisting of ice and oil-based glass. However, because of the water expansion during freezing, the core material will often be damaged in the process. The damage is caused by the fact that the inherent weak bonds between the sand particles are broken (more or less) because of frost cracking during the freezing step. After cutting with a diamond saw in a frozen condition, the core samples are not suitable for geological evaluation as the samples have been reduced to more or less freely flowing sand. After drilling of test plugs, mounting and thawing in analysis equipment, this frost cracking also frequently causes handling problems which again result in practical problems during subsequent analysis and testing.

2. Stabilisation of core samples in core sample tubes/pipes from injection of a quick-setting two component polymer mass.

A polymer mass is injected in a sickle-formed space between the core sample and the core sample tube. The commonly used polymer mass is based upon polymerization of an aromatic isocyanate composition (MDI/PMDI) catalyzed by a tertiary amine. The catalyst is often triethylene diamine ($N(CH_2-CH_2)_3)N$) or 1,4-diazabicyclo(2,2,2)-octane.

Research has shown that the method may involve formation of secondary products which may change the humidity properties of the samples. Moreover, in the hardening step there health hazardous secondary products may be formed and which may be liberated in subsequent working and cleaning of the core sample material.

The polymer material which is formed during the polymerization is a polyurea, and this material is sensitive to high temperatures. During core sample cutting with a diamond saw, local elevated temperatures can result, and in addition to health hazardous secondary products, some monomeric isocyanate including the more complex degradation products can be formed. The formation of such compounds make it desirable to use other methods to eliminate the risk of liberation of health hazardous products in the processing steps.

General Evaluation of Different Other Protecting Materials

After having performed a critical research of different possible organic based materials, it appears that the most of them have the potential to cause various type of problems. Such problems will usually arise from the fact that the curing processes are strongly affected by temperature, the mass ratio between water and oil in the core, the type of drilling fluid, the pH of the drilling fluid, and so on. Moreover, it appears that the humidity properties of a core sample may change due to migration of surface-active monomeric derivatives. These products usually arise from side reactions with polar components in the oil or additives in the drilling fluid. Moreover, it appears that more or less serious industrial hygiene problems may arise when several potentially applicable organic polymers are heated in connection with slabbing and core sampling where the core sample material is cut with diamond equipment. Rinsing with strong solvents in connection with preparation of core samples prior to analysis may also give rise to industry health problems because of the risk of extraction of low molecular poisonous compounds from polymers polymerized in unfavourable conditions.

Inorganic materials of a concrete basis may result in problems with slow strength formation. However, there are concrete types available which set rapidly, including additives controlling the setting rate, but none of these allow removal of possible permanent mineral precipitate which may cause local permeability and porosity damage in the core sample material without simultaneously causing damage to the core sample. The setting process can, as mentioned above, now be controlled by the addition of surface-active organic agents, but these agents may again result in undesirable changes in the humidity properties of the core samples. In a low-speed setting environment the samples must be left stationary for a longer period of time, thus preventing normal activity on the drilling floor. As a consequence of said properties, protection with concrete will cause a risk of irreversible changes in the core samples, which again result in increased uncertainty in the metering results.

Object

An object of the invention is to provide a curable gypsum-based composition for the production of cured gypsum, enabling an efficient use of gypsum as material in different situations, such as in building constructions, for example wall and floor finishing, production of casting molds of gypsum and in the production of gypsym articles in general.

Another object of the invention is to provide a method of stabilizing core samples of unconsolidated material from drilling holes, in a way which does not affect the core material chemically or physically and thereby causes as little as possible change in humidity properties, porosity and permeability. In addition, it is desirable that the protected material does not result in industry health problems caused by the liberation of health hazardous compounds in subsequent handling operations.

Because of the short period of time available for core sampling on a drilling rig for example, and a wish for quick protection of the material to mechanical damage without affecting the humidity properties and subsequent industry health problems, there is a need for a quick-setting inorganic protecting material. In addition, the curing material should have properties allowing for a proper control of the curing time in practical applications. The composition should, in a mixed condition, maintain its fluid state for 5 to 8 minutes, thus allowing the mass of material to enter all cavities before setting. Because of the time limitation mentioned above, the composition should set sufficiently to allow the core samples to be moved without risk of damage during 10 to 20 minutes, thus ensuring that the time required to protect the core samples does not delay the costly drilling operation more than is absolutely necessary.

To ensure the core sample is not contaminated by the protecting material, it should be possible to remove the latter by flushing with a liquid not affecting the properties to be examined at a later stage.

The Invention

In one aspect, the invention is related to a curable gypsum-based composition for the production of cured gypsum for, e.g., wall finishing, production of gypsum articles, and production of casting molds of plaster, by using a water solution of calcined gypsum comprising a set retarding substance. According to the present invention, the composition comprises a two-component composition comprising:

(a) a first component comprising calcined gypsum suspended in water, and a set retarding substance comprising
   (i) an organic acid containing at least two acid groups selected from the group consisting of carboxyl, sulphate, sulphonate, phosphate or phosphonate, said acid optionally also containing at least one hydroxyl group per molecule; and/or
   (ii) inorganic anions selected from the group consisting of polyphosphate and polyborate, or mixtures thereof, and (b) a second component comprising a set accelerating substance comprising
   (iii) water soluble salts of multivalent metal ions, and optionally
   (iv) organic or inorganic salts of ammonium and/or elements from the first group of the periodic table of elements.

The set retarding substance preferably comprises citric acid, fruit acid or polyphosphate. Moreover, it is preferred that the set retarding substance constitutes 0.001–0.5%, preferably 0.01–0.2%, and most preferred from 0.02 to 0.1% by weight of the gross water quantity in the first component (a).

In accordance with the invention, the set accelerating substance in the component (b) above comprises multivalent metallic ions, such as easily soluble salts of Fe(III), Fe(II), Al(III), Gallium(III), Titanium(IV), Zirconium(IV), Vanadium(III), Cobalt(III) and/or Chromium(III). In view of availability, health hazard and effect, it is preferred to use salts of Fe(III), Fe(II) and Al(III).

The multivalent cations in component (b) form complexes with, or precipitate the set retarding substances in component (a), thus preventing or eliminating the effect of the latter on the hydration reaction between water and calcined gypsum.

Moreover, it is preferred that component (b), which preferably is present in a solution, also contains set accelerating substances in the form of easily soluble salts of ammonium, such as $NH_4Cl$, and/or easily soluble salts of metals from the first group of the periodic table of elements, such as $NaCl$, $KCl$ and $K_2SO_4$. Combinations thereof can also be used.

When the set retarding substance of component (a) in general comprises phosphate or a polyphosphate, it is preferred to use salts of Al(III) in the set accelerating component (b), thus avoiding discoloring of the end product, which may occur from the use of ferric ions.

As set forth in further detail below, one or both of the components, preferably component (b), may in addition contain crystallization seeds in the form of comminuted gypsum ($CaSO_4.2H_2O$) to promote the setting rate of the curable composition.

In use, separate units of component (a) and (b) above are prepared, wherein the retarded gypsum suspension may exhibit a pot life of about 1 hour. The pot life may, if desired, be changed by altering the quantities of the components. Immediately before use, component (a) is mixed with the accellerator component (b), whereupon the gypsum composition obtains a gelation time of 2–15 minutes, preferably 5–19 minutes.

Accordingly, the composition according to the invention provides a gypsum-based curable composition having a long pot life and a short setting time, thus enabling effective use of said material in different fields of use, such as for wall finishing, production of casting molds for casting of different plaster products in industry and in construction engineering, and many other uses are conceivable. The selection of set controlling substances and the concentration thereof will usually vary from one application to another.

In another aspect, the invention is related to a method for stabilizing unconsolidated core samples taken from drilling holes. We have surprisingly found that different types of calcined gypsum ($CaSO_4.½H_2O$ and $CaSO_4$) which re-crystallize to form gypsum ($CaSO_4.2H_2O$) by addition of water, are well suited for protection of poorly consolidated core sample material. Since gypsum expands linearly 0.2–0.3% during hardening, this material is suited for locking and supporting of the core material to be used. Moreover, it is convenient to control the setting time for gypsum wihin wide limits through additions having low molecular weight. The additives used in this case shall have small or no effect on the humidity properties.

In the following, the invention is described with emphazis on encapsulation of unconsolidated core material from drilling holes, since the basic idea of the invention is common for both embodiments.

Particularly in encapsulation of core samples, gypsum has in addition to the other properties an advantage of being easily removable from the core material. This is achieved by flushing with water solutions having a high content of salts such as NaCl, NaAc, $Na_2SO_4$, KCl, KAc, $K_2SO_4$, $NH_4Cl$, $NH_4Ac$, $(NH_4)SO_4$, or if necessary, through additions of sugar alcohols as glycerol, sorbitol, maltitole, different mono- and di-saccarides and complex-forming compounds as NTA and EDTA. The list above should not be considered limiting to low molecular compounds which may contribute to increased solubility of gypsum. When organic additives are used, the water must still contain at least 0.5% salt (NaCl/KCl) to prevent migration of clay particles.

For example, one of the parameters affecting flow property, concentration of gypsum in the gypsum slurry and the strength of cured gypsum, is the quality of the calcined gypsum used. There are two major types of calcined gypsum having the formula $(CaSO_4.\frac{1}{2}H_2O)$ in use today: the $\alpha$ form which is formed by dehydration of gypsum to calcined gypsum in an atmosphere of saturated water vapour, in boiling pressurized water or in salt solutions at elevated temperatures and a certain pressure, and the $\beta$ form which is produced by dry heating of gypsum. Whereas the $\alpha$ form allows for high density and high compression strength within a heavy but to a certain degree brittle final product, the $\beta$ form will provide a final product having a lower total compressive strength because of a lower gypsum content, but the products are in return less brittle because of the particular structure.

Moreover, there are other qualities of dry calcined gypsum $(CaSO_4)$ which also easily cure to form gypsum $(CaSO_4.2H_2O)$ in the presence of water. The different qualities of dry calcined gypsum are obtained by varying the calcining temperature from 100 to 700° C. and changing the curing profile. The most commonly used commercial qualities of the $\beta$ form of calcined gypsum $(CaSO_4.\frac{1}{2}H_2O)$ also contain smaller amounts of dry calcined gypsum $(CaSO_4)$, and therefore in practice the curing process for gypsum qualities of this type consists of several simultaneous hydrating reactions.

It is commonly known that the most of the calcined gypsum qualitites enable production of a curing material when mixed with water. Moreover, it is known that such compositions may contain larger or smaller amounts of substances accelerating or retarding the curing process.

It is known to accellerate the curing process of gypsum through the addition of some water soluble salts to the plaster slurry, such as NaCl, NaAc, $Ns_2SO_4$, KCl, KAc, $K_2SO_4$, $NH_4Cl$, $NH_4Ac$, $(NH_4)SO_4$, without limitation. Addition of accelerators allow for production of a plaster slurry, water and accelerator additives which is able to set and harden to a solid mass within 2–30 minutes, dependent on the quantity of accelerating additives and the gypsum quality used. By selecting a proper quantity for supply, dependent on type, quality and concentration of gypsum in the plaster slurry, the setting time (with some limitations) may be adjusted to a desired value.

Moreover, there are insoluble salts having a crystal structure catalyzing the conversion from one form or another of calcined gypsum to gypsum. In this connection, gypsum $(CaSO_4.2H_2O)$ must be emphasized, since this salt in a comminuted form will increase the conversion rate by increasing the number of seeds.

By increasing the curing time one may use additions of multivalent organic acids such as citric acid, fruit acid and their soluble salts, simple phosphates, condensed phosphates or borates. There are no distinct rules for the chemical structures, which in low concentration establish a bond to components in a curing gypsum system, and the hardening process is retarded simultaneously and the requirement of forming sufficiently stable precipitates or complexes with supplied multivalent metal ions which result in blocking of the retarding effect. But within the group organic polyanions there will be many compounds having the ability of extending the setting time of gypsum vith varying effectiveness. Organic polyanions will then be based on containing at least two carboxyl, sulphate, sulphonate, phosphate and phosphonate groups, or mixtures thereof, optionally also one or more hydroxy groups. Inorganic anions having the same effect are condensed borates, simple and complexed phosphates, particularly Grahams salt.

The simplest embodiment of the method in accordance with the invention is characterized in that a predetermined quantity of gypsum is mixed with a predetermined quantity of fresh water, or water of similar quality, forming a liquid slurry, and then filling the slurry in the slit space between the core sample and the core sample tube whereupon the slurry hardens and provides sufficient stiffness and protection of the core sample within 10–30 minutes, and hardens completely within about twice the time set forth above. The resulting plaster slurry may also contain one or more accelerating substances in varying quantities, so that the time required to obtain sufficient stiffness and protection of the core sample may be decreased to a desired level of between two minutes and the native setting time of the plaster slurry without additives, but preferably with a hardening time of from 8 to 20 minutes.

When stabilizing several poorly consolidated core samples quickly one after another, the operations may result in stress on the operator because the time between mixing and gelation is fairly short if the gypsum is to have a sufficient stiffness within 10–15 minutes to thereby allow the core samples to be moved. Continuous weighing of calcined gypsum coupled with volumetric dosing of water or acccelerator solution in a mixing unit results in further practical problems as dosing of a hygroscopic powder having a poor flow property, as the case is with gypsum, is practically difficult. However, the flow property of the gypsum powder may be enhanced through the addition of hydrophobic silica or stearate salts from the second and third main group of the periodic table of the elements. This type of additives, however, may interfer with the porosity, permeability or the humidity properties of the samples.

As mentioned above, handling and continous weighing is problematic when a hygroscopic powder having a poor flow property is present in a humid environment. Moreover, the plaster slurry formed must be able to be pumped continously from a mixer unit to the user location. The demand on low viscosity of the plaster slurry interferes with a desire for quick gelation and establishment of strength. In shorter interruptions in a casting operation using continous weighing and mixing, the plaster slurry will tend to harden in the apparatuses, which again requires a cleaning operation to remove cured gypsum mass before the casting operation can take place. Such problems will cause a time delay and therefore incur increased costs in connection with sample core protection.

The viscosity of the plaster slurry may also be modified through additives. It is known that addition of substances such as alkylaryl sulphonates, lignosulphonates and melamines provides improved flow of gypsum/water compositions and in this way provide pumpability even with a low water content. An important disadvantage is that these compounds, often having a high molecular weight, also may affect the humidity properties of the core sample material. Additives of this type are for that reason avoided.

Based upon the available knowledge of the effect of different compounds on gypsum hardening including the knowledge of structure, stability and rate of formation of complexes and precipitates from anions and multivalent cations, we have surprisingly found that it is possible to produce a hardening system based upon calcined gypsum in water including additives, which in practice perform like a system hardening through mixing of two flowing components. The hardening system is characterized in that gypsum, which initially has become retarded through the addition of certain anions, again retain a hardening rate close to the original by adding cations establishing a bond to the anions added with a strength sufficient to substantially suspend the anion's effect on the curing rate. The process is also characterized in that the addition may contain one or more chemical components increasing the hardening rate above the native hardening rate of the plaster slurry.

Since the different qualities of calcined gypsum ($CaSO_4 \cdot \frac{1}{2}H_2O$) and dry calcined gypsum ($CaSO_4$) with the different combinations of additives provides a variety of ways of acheiving the desired process, it is in practice impossible to describe all these possibilities. In the following, there is set forth a description of some examples of possible compositions with a commonly available β form of calcined gypsum. The description primarily shows examples of typical quantities which may be used to obtain a result useful for encapsulation of core samples. This is not meant to limit the number of possible compositions and quantities which can provide useful protection of core samples. The possibility of using a similar process in other industrial operations based upon different types of calcined gypsum, water and additives in a composition or mixture is not precluded either.

A retarded plaster slurry is formed of β gypsum with retarding additives which are dispersed in the water which is not to be used for metal ion salvation, which again will increase the hardening rate of the plaster slurry. A plaster slurry with decreased hardening rate is characterized by containing from 0.001 to 0.5% retarding compounds based upon the water quantity in the form of an organic acid or the anion of the acid. Preferably, the plaster slurry should contain from 0.01 to 0.2% organic acid in one form or another, and perferably from 0.02 to 0.1% retarding material in the form of a free acid or its anions—all based upon the total water quantity. Moreover, the retarded plaster slurry is characterized in using citric acid, fruit acid or their salts as organic anionic additive. Other organic acids which may provide a desired effect are available, and they are characterized by containing two or more carboxyl, sulphonate, sulphate, phosphonate and/or phosphate groups—optionally including one or more hydroxy groups in the same molecule.

The remainder of the water is required to dissolve a salt of multivaltent metal ions forming complexes or insoluble salts of the acids or of their anions, thus substantially eliminating the retarding effect of the acids or their anions on the hardening rate. This will cause the hardening rate of a plaster slurry to approach the rate of a slurry without addition of retarding substances. The metal ions used for this purpose are characterized by a rapid formation of complexes or insoluble salts with the acids or their anions, which extend the hardening time of the gypsum. The complexes or insoluble salts formed are characterized by being so stable that the effect of the acids or the salts on the gypsum hardening rate is substantially neutralized.

In accordance with the present invention, it has been found that the Fe(III) ion is the cation which is most suited for forming a complex or an insoluble salt with the acids/salts inhibiting the gypsum hardening process, and having a stability causing the acids or anions to all substantially be removed. However, bivalent ferric ions may also be added, which by oxidation with dissolved oxygen or a water soluble oxidating agent produce trivalent ferric ions providing the desired effect.

When using phosphate or condensated phosphates in order to extend the curing time of gypsum, several polyvalent metal ions besides Fe(III) can be used. It is in particular the highest condensated linear polyphosphates (Grahams salt) which are most effective in extending the hardening time. Because of the structure of the polyphosphates and the characteristic hydrolysis stability, insoluble salts will be rather rapidly formed via the first complexes by adding trivalent ions from the third group of the periodic table of elements, or ions of the inner transition elements and rare earth metals having high oxidation levels. The effect of polyphosphates may therefore conveniently be removed by the addition of several types of multivalent metal ions. One disadvantage of metal ions except iron(III) and aluminum (III) is the high price and that such ions are formation enhancing involving a risk of introducing cations and undesirable effects in the core samples. Both aluminum(III) and iron(III) ions have acted excellently in practical tests. Accelerating additives together with the polyvalent additive ions can also in this case increase the hardening rate in the same way as mentioned above for the organic polyanions.

For organic anions and acids it appears that the assortment of cations giving the desired effect is more limited as for the moment only Fe(III) with some exceptions give the desired result with regard to formation conformability, stability, rate of formation and toxicity of the complex. By the addition of for example NTA which retards the hardening process, one has to resort to formation enhancing cations to restrain the retarding effect of the acid, whereas for fruit acid, aluminum ions will also provide fairly acceptable results.

To facilitate the mixing process when using two liquid components, two volumetric pumps and one static mixer are used, and the final plaster slurry, still not yet hardened, can be supplied directly but gradually to the sickle formed space between the core sample and the core sample pipe. The plaster slurry forms a gel within 4–9 minutes and hardens to sufficiently strong gypsum within 7–20 minutes. With a fresh plaster slurry it may be necessary to use as much as 20 minutes to develop sufficient strength, whereas a retarded slurry which has been put aside for almost one hour need no more than 7 to 9 minutes to develop sufficient strength.

EXAMPLE 1

3.75 kg calcined gypsum is added to 2.5 l water while stirring to form a plaster slurry having a volume of about 3.925 l. This composition cures sufficiently to protect a core sample in a core sample pipe to allow the core sample to be moved after 35–45 minutes.

EXAMPLE 2

3.75 kg calcined gypsum and 62.5 g NaCl are dissolved in 2.5 l water while stirring to form a plaster slurry having a volume of about 3.925 l. This composition sets sufficiently to protect a core sample in a core sample pipe and allow the core sample to be moved after 10–15 minutes.

EXAMPLE 3

3.75 kg calcined gypsum and 40.0 g KCl are added to 2.5 l water while stirring to form a plaster slurry having a volume of about 3.925 l. This composition hardens sufficiently to protect a core sample in a core sample pipe to allow the core sample to be moved after 10–15 minutes.

EXAMPLE 4

3.75 kg calcined gypsum and 60.0 g $NH_4Cl$ are added to 2.5 l water while stirring to form a plaster slurry having a volume of about 3.925 l. This composition hardens sufficiently to protect a core sample in a core sample pipe to allow the core sample to be moved after 10–15 minutes.

EXAMPLE 5

3.75 kg calcined gypsum and 30.0 g $K_2SO_4$ are dispersed in 2.5 l water to form a plaster slurry having a volume of about 3.925 l. This composition hardens sufficiently to protect a core sample in a core sample pipe to allow the core sample to be moved after 10–15 minutes.

EXAMPLE 6

Component 1

1 g citric acid in the form of a soluble citrate and 3.75 kg calcined gypsum are dispersed in 2.25 l water to form a plaster slurry having a volume of about 3.675 l. This composition has a hardening rate so low that it will remain liquid for almost one hour. Prior to gelation, the composition will be usable as one of said two components, which will harden when mixed with an accelerator solution.

Component 2

The accelerator solution comprises a saturated solution of KCl. The volumetric mixing ratio between accelerator and hardener and retarded plaster slurry will be close to 1:14.7 resulting in 0.25 l of component 2 and a total volume of 3.925 l. The time required to obtain a sufficient strength to move the core sample is from 22 to 35 minutes.

EXAMPLE 7

Component 1

1 g citric acid in the form of a soluble citrate and 3.75 kg calcined gypsum are dispersed in 2.25 l water to form a plaster slurry having a volume of about 3.675 l. This composition has a hardening rate so slow that it will remain liquid for almost an hour. Prior to gelation, the composition will be usable as one of said two components in a two-component system, which will harden rapidly when mixed with an accelerator solution.

Component 2

The accelerator solution comprises 0.25 l saturated KCl solution supplied with 1.408 g of the water soluble metal ion salt $FeCl_3.6H_2O$. The Fe-ions form stable complexes and establishes a bond to citrate anions more strongly than to gypsum, thus blocking the retarding effect. The volumetric mixing ratio of accelerator and hardener and retarded plaster slurry will be close to 1:14.7, resulting in 0.25 l of component 2 and a total volume of 3.925 l. Time to obtain sufficient strength to allow the core sample to be moved is 15 to 20 minutes.

EXAMPLE 8

Component 1

1 g citric acid in the form of a soluble citrate and 3.75 kg calcined gypsum are dispersed in 2.25 l water to form a plaster slurry having a volume of about 3.675 l volume. The composition has a hardening rate so slow that the composition will remain liquid for almost one hour. Prior to gelation, the composition will be usable as said one component in a two-component system, which will harden rapidly when mixed with an accelerator solution.

Component 2

The accelerator solution comprises 0.25 l saturated KCl solution supplied with 2.816 g of the water soluble metal ion salt $FeCl_3.6H_2O$. The Fe-ions form stable complexes and will become more strongly bonded to citrate ions than to gypsum, thus blocking the retarding effect. The volumetric mixing ratio of accelerator and hardener and retarded plaster slurry will be close to 1:14.7, resulting in 0.25 l of component 2 and a total volume of 3.925 l. The time required to obtain a sufficient strength to allow the core sample to be moved is from 10 to 16 minutes.

EXAMPLE 9

Component 1

1 g citric acid in the form of a soluble citrate and 3.75 kg calcined gypsum are dispersed in 2.25 l water to form a plaster slurry having a volume of about 3.675 l. This composition has a hardening rate so slow that it will remain fluid for almost one hour. Prior to gelation, the composition will therefore be usable as said one component in a two-component system, and will harden rapidly when mixed with an accelerator solution.

Component 2

The accelerator solution comprises 0.25 l saturated KCl solution supplied with 4.224 g of the water soluble metal ion salt $FeCl_3.6H_2O$. The Fe-ions form stable complexes and bonds more strongly to citrate ions than to gypsum, thus blocking the retarding effect. The volumetric mixing ratio between accelerator and hardener and retarded plaster slurry will be close to 1:14.7, resulting in 0.25 l of component 2 and a total volume of 3.925 l. The time required to obtain a sufficient strength to allow the core sample to be moved is from 9 to 15 minutes.

EXAMPLE 10

Component 1

1 g citric acid in the form of a soluble citrate and 3.75 kg calcined gypsum are dispersed in 2.25 l water to form a plaster slurry having a volume of about 3.675 l. This composition exhibits a setting rate so slow that it will remain fluid for about one hour. Prior to gelation, the composition is usable as said one component in a two-component system, and will harden rapidly when mixed with an accelerator solution.

Component 2

The accelerator solution comprises 0.25 l saturated KCl solution supplied with 5.617 g of the water soluble metal ion salt $FeCl_3.6H_2O$. The Fe-ions form stable complexes and will establish a stronger bond to the citrate ions than to gypsum, thus blocking the retarding effect. The volumetric mixing ratio between accelerator and retarded plaster slurry will become close to 1:14.7, resulting in 0.25 l of component 2 and a total volume of 3.925 l. The time required to obtain a sufficient strength to allow the core sample to be moved is from 9 to 15 minutes.

EXAMPLE 11

Component 1

0.75 g citric acid in the form of a soluble citrate and 3.75 kg calcined gypsum are dispersed in 2.25 l water to form a plaster slurry having a volume of about 3.675 l. This composition exhibits a setting rate so slow that it will remain fluid for about one hour. Prior to gelation, the composition is usable as said one component in a two-component system, and will harden rapidly when mixed with an accelerator solution.

Component 2

The accelerator solution comprises 0.25 l saturated KCl solution supplied with 4 g of the water soluble metal ion salt $FeCl_3.6H_2O$. The Fe-ions form stable complexes and will establish a stronger bond to the citrate ions than to gypsum, thus blocking the retarding effect. The volumetric mixing ratio between accelerator and retarded plaster slurry will become close to 1:14.7, wherein component 2 constitutes 0.25 l resulting in a total volume of 3.925 l. The time required to obtain a sufficient strength to allow the core sample to be moved is from 9 to 15 minutes.

EXAMPLE 12

Component 1

0.75 g citric acid in the form of a soluble citrate and 3.75 kg calcined gypsum are dispersed in 2.25 l water to form a plaster slurry having a volume of about 3.675 l. This composition exhibits a setting rate so slow that it will remain fluid for about one hour. Prior to gelation, the composition is usable as said one component in a two-component system, and will harden rapidly when mixed with an accelerator solution.

Component 2

The accelerator solution comprises 0.25 l saturated $K_2SO_4$ solution supplied with 3.96 g of the water soluble metal ion salt $FeCl_3.6H_2O$. The Fe-ions form stable complexes and will establish a stronger bond to the citrate ions than to gypsum, thus blocking the retarding effect. The volumetric mixing ratio between accelerator and retarded plaster slurry will become close to 1:14.7, wherein component 2 constitutes 0.25 l resulting in a total volume of 3.925 l. The time required to obtain a sufficient strength to allow the core sample to be moved is from 13 to 20 minutes.

EXAMPLE 13

Component 1

1 g fruit acid in the form of a soluble salt and 3.75 kg calcined gypsum are dispersed in 2.25 l water to form a plaster slurry having a volume of about 3.675 l. This composition exhibits a setting rate so slow that it will remain fluid for about one hour. Prior to gelation, the composition is usable as said one component in a two-component system, and will harden rapidly when mixed with an accelerator solution.

Component 2

The accelerator solution comprises 0.25 l saturated KCl solution supplied with 4 g of the water soluble metal ion salt $FeCl_3.6H_2O$. The Fe-ions form stable complexes and will establish a stronger bond to the fruit acid ions than to gypsum, thus blocking the retarding effect. The volumetric mixing ratio between accelerator and retarded plaster slurry will become close to 1:14.7, wherein component 2 constitutes 0.25 l resulting in a total volume of 3.925 l. The time required to obtain a sufficient strength to allow the core sample to be moved is from 7 to 12 minutes.

EXAMPLE 14

Component 1

1 g fruit acid in the form of a soluble salt and 3.75 kg calcined gypsum are dispersed in 2.25 l water to form a plaster slurry having a volume of about 3.675 l. This composition exhibits a setting rate so slow that it will remain fluid for about one hour. Prior to gelation, the composition is usable as said one component in a two-component system, and will harden rapidly when mixed with an accelerator solution.

Component 2

The accelerator solution comprises 0.25 l saturated KCl solution supplied with 3.573 g of the water soluble metal ion salt $AlCl_3.6H_2O$. The aluminum ions form complexes with the fruit acid anions, wherein the complexes will establish a stronger bond to the anions than to gypsum, thus substantially blocking the retarding effect. The volumetric mixing ratio between accelerator and retarded plaster slurry will become close to 1:14.7, wherein component 2 constitutes 0.25 l resulting in a total volume of 3.925 l. The time required to obtain a sufficient strength to allow the core sample to be moved is from 14 to 20 minutes.

EXAMPLE 15

Component 1

1.25 g polyphosphoric acid in the form of a soluble salt and 3.75 kg calcined gypsum are dispersed in 2.25 l water to form a plaster slurry having a volume of about 3.675 l. This composition exhibits a setting rate so slow that it will remain fluid for about one hour. Prior to gelation, the composition is usable as said one component in a two-component system, and will harden rapidly when mixed with an accelerator solution.

Component 2

The accelerator solution comprises 0.25 l saturated KCl solution supplied with 4 g of the water soluble metal ion salt $FeCl_3.6H_2O$. The Fe-ions form complexes with the polyphosphate ions and insoluble precipitate with the low molecular weight hydrolysis products of the poly anions. These complexes and precipitates establish a stronger bond to the phosphoric acid based anions than to gypsum, thus blocking the retarding effect. The volumetric mixing ratio between accelerator and retarded plaster slurry will become close to 1:14.7, wherein component 2 constitutes 0.25 l resulting in a total volume of 3.925 l. The time required to obtain a sufficient strength to allow the core sample to be moved is from 6 to 10 minutes.

EXAMPLE 16

Component 1

1.25 g poly phosphoric acid in the form of a soluble salt and 3.75 kg calcined gypsum are dispersed in 2.25 l water to form a plaster slurry having a volume of about 3.675 l. This composition exhibits a setting rate so slow that it will remain fluid for about one hour. Prior to gelation, the composition is usable as said one component in a two-component system, and will harden rapidly when mixed with an accelerator solution.

Component 2

The accelerator solution comprises 0.25 l saturated KCl solution supplied with 3.573 g of the water soluble metal ion salt $AlCl_3.6H_2O$. The aluminum ions form complexes with the polyphosphate ions and insoluble precipitate with the low molecular weight hydrolysis products of the polyanions. These complexes and the precipitate establish a stronger bond to the phoshporic acid-based anions than to gypsum, thus blocking the retarding effect. The volumetric mixing ratio between accelerator and retarded plaster slurry will become close to 1:14.7, wherein component 2 constitutes 0.25 l resulting in a total volume of 3.925 l. The time required to obtain a sufficient strength to allow the core sample to be moved is from 6 to 10 minutes.

We claim:

1. A curable gypsum-based composition for the production of a cured gypsum matrix, wherein the composition consists essentially of an aqueous suspension of calcined gypsum, set retarding polyanions, set accelerating salts and optionally a seed initiator in a two-component composition:

(a) a first component consisting essentially of calcined gypsum suspended in water, optionally said seed initiator, and a set retarding substance comprising (i) an organic acid containing at least two acid groups selected from the group consisting of carboxyl, sulphate, sulfonate, phosphate and phosphonate, said acid optionally also containing at least one hydroxy group per molecule; or (ii) inorganic anions selected from the group consisting of polyphosphate polyborate, and mixtures thereof, or (iii) mixtures of said organic acid and said inorganic anions; and (b) a second component comprising a set accelerating substance comprising (iv) water soluble salts of multivalent metal ions, and optionally (v) organic or inorganic salts of ammonium and/or elements from the first group of the periodic table of elements.

2. The composition of claim 1, wherein the set retarding substance comprises citric acid, fruit acid, polyphosphoric acid or mixtures thereof.

3. The composition of claim 1, wherein the first component includes a total amount of water; and the set retarding substance constitutes from 0.001 to 0.5 percent by weight of the total amount of water in said first component (a).

4. The composition of claim 1 wherein the first component includes a total amount of water; and the set retarding substance constitutes from 0.01 to 0.2 percent by weight of the total amount of water in said first component (a).

5. The composition of claim 1 wherein the set accelerating substance comprises salts of Fe (III), Fe (II), Al (III), or mixtures thereof, and wherein the salts neutralize the effect of the set retarding substances in said component (a) by forming insoluble salts or stable complexes.

6. The composition of claim 1 wherein the set accelerating substance comprises salts or ions from the first group of the periodic table of the elements or mixtures thereof.

7. The composition of claim 5 wherein the set accelerating substances in said component (b) are present in a water solution.

8. The composition of claim 1, wherein the seed initiator is in the form of comminuted gypsum ($CaSO_4 \cdot 2H_2O$).

9. Method for stabilizing an unconsolidated core sample material from a drilling hole, comprising encapsulating the core sample material, which after retrieval from the drilling hole is located in a core sample pipe, at least partially with an encapsulation material supplied to a space established between the core sample material and the core material pipe, wherein the encapsulation material is a plaster slurry comprising a water solution of calcined gypsum, optionally added with one or more set-controlling substances, and hardening the resulting plaster slurry to a solid mass which at least partly encapsulates and stabilizes the unconsolidated core sample material.

10. The method of claim 9, wherein said calcined gypsum is a compound selected from the group consisting of the α-form of calcined gypsum, the β-form of calcined gypsum, dry calcined gypsum, and a combination thereof.

11. The method of claim 9 wherein the set-controlling substance is a set accelerating substance selected from the group consisting of NaCl, NaAc, $Na_2SO_4$, KCl, KAc, $K_2SO_4$, $NH_4Cl$, $NH_4Ac$ and $(NH_4)_2SO_4$.

12. The method of claim 9 wherein the set-controlling substance is a set retarding substance comprising;

one or more organic acids having at least two acid groups per molecule selected from the group consisting of carboxyl, sulphate, sulfonate, phosphate, phosphonate, and mixtures thereof wherein said acid optionally contains one or more hydroxy groups per molecule; or inorganic anions selected from the group consisting of polyphosphate, polyborate, and mixtures thereof.

13. The method of claim 9, wherein the set controlling substance is a set retarding substance comprising citric acid, citrate, fruit acid, maleates, Grahams salt or mixtures thereof.

14. The method of claim 9 further comprising the step of adding a seed initiator in the form of comminuted gypsum ($CaSO_4 \cdot 2H_2O$) to the slurry of calcined gypsum.

15. The method of claim 9 wherein the set-controlling substance is water soluble salts of elements selected from the groups consisting of Fe(III), Fe(II), Al(III), Ga(III), Ti(IV), Zr(IV), V(III), Co(III), Cr(III) and mixtures thereof.

16. The composition of claim 4, wherein the first component includes a total amount of water; and the set retarding substance constitutes from 0.02 to 0.1 percent by weight of the total amount of water in said first component.

17. A curable gypsum-based composition for the production of a cured gypsum matrix, consisting essentially of two components:

a first component consisting essentially of calcined gypsum suspended in water, a set retarding substance and optionally a seed initiator, said set retarding substance consisting essentially of (i) an organic acid containing at least two acid groups selected from the group consisting of carboxyl, sulphate, sulfonate, phosphate and phosphonate, said organic acid optionally also containing at least one hydroxy group per molecule, (ii) inorganic anions selected from the group consisting of polyphosphate, polyborate and mixtures thereof, or (iii) mixtures of said organic acid and said inorganic anions; and a second component consisting essentially of a set accelerating substance and optionally a seed initiator, said set accelerating substance consisting essentially of (iv) water soluble salts of multivalent metal ions, and optionally (v) organic or inorganic salts from the group consisting of ammonium, elements from the first group of the periodic table and mixtures thereof.

* * * * *